United States Patent [19]

Cox, III et al.

[11] 3,889,252

[45] June 10, 1975

[54] METHOD AND SYSTEM FOR TRANSMITTING SIGNALS IN THEATRES

[75] Inventors: Charles H. Cox, III, Arlington, Mass.; Albin M. Aukerlund, Philadelphia, Pa.

[73] Assignee: Charles H. Cox, III, Arlington, Mass.

[22] Filed: Oct. 25, 1972

[21] Appl. No.: 300,664

[52] U.S. Cl. ................ 340/313; 179/1 AT; 325/55; 325/64; 340/310 R

[51] Int. Cl. ................ H04b 3/00

[58] Field of Search ............ 340/310 R, 313, 171 R, 340/171 A, 171 PF; 179/1 AT, 2 A, 1 DD, 1 H, 15 BA, 15 FD; 325/55, 64, 53, 308; 178/17.5

[56] References Cited

UNITED STATES PATENTS

| | | | |
|---|---|---|---|
| 1,988,614 | 1/1935 | Tuczek | 340/171 |
| 2,557,408 | 6/1951 | Brady | 179/1 DD |
| 3,140,468 | 7/1964 | Blaisdell et al. | 340/171 R |
| 3,281,789 | 10/1966 | Willcox et al. | 325/53 |
| 3,495,219 | 2/1970 | Clapp et al. | 340/171 R |
| 3,534,161 | 10/1970 | Friesen et al. | 340/310 R |
| 3,676,859 | 7/1972 | Hollaway et al. | 178/17.5 |

*Primary Examiner*—John W. Caldwell
*Assistant Examiner*—Joseph E. Nowicki
*Attorney, Agent, or Firm*—Paul & Paul

[57] ABSTRACT

A theatre system for transmitting from a central station warn, cue and alphanumeric signals to remote locations, adapted to utilize existing power system lines for transmission of signals from said central station to said remote locations. The central station is equipped to generate a plurality of carriers, each corresponding to a respective remote station, which carriers are mixed with a modulated primary carrier and coupled to the power system line. Each remote station comprises frequency selective circuitry for detecting when a warn or cue signal has been addressed to it, for providing a display of alphanumeric information when it is sent, and response circuitry for allowing an operator at each such remote station to respond to the central station.

6 Claims, 5 Drawing Figures

METHOD AND SYSTEM FOR TRANSMITTING SIGNALS IN THEATRES

BACKGROUND OF THE INVENTION

A. Field of the Invention

This invention lies in the field of signal systems for theatres and, more particularly theatre systems for transmitting warn and cue signals and alphanumeric information from a central location to a plurality of remote locations, and adapted to utilize the existing power system lines within the theatre as the primary communications path.

B. Description of the Prior Art

All theatres designed for performance of theatrical productions necessarily have a system for sending warn and cue signals. In the course of a theatrical production, be it musical, dramatic or otherwise, it is frequently necessary for the stage manager to cue actions which occur in varying combinations and at remote locations. The initiation of these actions is generally accomplished by a system of signal lights located at appropriate remote areas and controlled by the stage manager from some central vantage point.

More often than not, the systems installed in theatres are a temporary expedient. The reason for this is that at time of installation of a system, it is not possible to accurately predict either the number or location of the remote signal stations required for any particular future production. Further, it would be extremely expensive to permanently install remote signal stations at all foreseeable locations. In practice, a typical system consists of a plurality of remote signal lights, usually capable only of providing on-off type information; a central control panel containing a control switch corresponding to each such remote signal light; and permanently installed connecting conductors between such central control station and the remote signal lights. Where a large number of remote stations are employed, various arrangements of master switching are employed.

In operation of such prior art systems, the stage manager energizes only the circuits connected to those stations which are to receive cues. For example, illumination of a given signal light serves as a warning to the operator at such location that a cue is forthcoming, and that certain action is to be taken. Extinguishing the signal light typically serves as the actual cue to commence the action.

Prior art cue signal systems, typically of the type described hereinabove, inherently possess the following disadvantages:

1. When permanently installed, the system possesses too little flexibility to adequately provide for the range of productions which it must serve in its theatre. For example, the number of remote stations provided may be insufficient. In other instances, while there may be sufficient remote stations, they may be improperly located for the cuing applications of a particular production. Further, a permanent location for the master, or central control panel, while well chosen for most productions, may prove to be disadvantageous in certain types of dramatic and musical productions.

2. A temporary system requires the installation of a special network of connectors from the central station to each remote station, for each different performance.

3. The information transmitted provides only for timing the occurrence of a remote action, and gives no specific indication of what that action is to be. Further, no feedback is provided to indicate that the operator has been alerted.

SUMMARY OF THE INVENTION

It is an object of this invention to provide a theatre warn and cue system which overcomes the above disadvantages of prior art systems, which is flexible, which is easily modified for different theatrical productions, which provides warn and cue information, and which is capable of storing, sending and displaying alphanumeric information.

It is another object of this invention to provide a method for use in a theatre for warning and cuing from a central location a plurality of actions to be taken at remote locations throughout the theatre.

It is another object of this invention to provide a warn and cue system for use in a theatre providing capability of communicating responses from remote locations to a central location, which responses indicate the receipt of signals transmitted from said central control station.

It is a further object of this invention to provide a means for storing and conveying alphanumeric information related to actions which are to be executed at the time of a cue or at other times during a theatrical performance.

In accordance with the above objectives, there is provided a theatre warn and cue system comprising a central control station adapted to be connected to the power system installed in the theatre through a conventional connecting line, having circuitry for mixing selected subcarriers on a main carrier and switching apparatus for introducing alphanumeric information which modulates the main carrier, and a plurality of remote stations located throughout the theatre, each adapted to be connected directly to the power system through a conventional line plug. Each such remote station has a frequency selective circuit for receiving and demodulating a selected one of said subcarriers and indicators for indicating the receipt of warn and cue signals; demodulator and logic circuitry for demodulating received alphanumeric information signals and alphanumeric readout indicators for indicating such information; and a respond transmitter modulator operable at said remote location for transmitting to said central location a signal indicating receipt of a warn signal.

DESCRIPTION OF THE PREFERRED EMBODIMENT

In the description of the apparatus of this invention, frequent reference will be made to various switches. The switching action described is performed by double throw, pushbutton switches, two types of which are used. Those switches referred to as being "engaged/-disengaged" are of the type commonly designated "push to lock/push to release". Hence, pressing these switch buttons causes them to change from one throw to the other and remain there after the pressure is released. The second type of push-button switch, which is referred to as being simply "pressed", is of the type commonly designated "momentary contact". Pressing a switch button of this type causes it to change to its other throw, or switch position, only so long as pressure is applied by the operator. Further, unless stated otherwise, it is understood that all the push-button switches are rear illuminated. Some of such rear illuminated switches are capable of split-face illumination. Unless specifically stated otherwise, where it is stated that a push button is illuminated, it is meant that the entire push button face is illuminated.

A central feature of the system of this invention is the utilization of pre-existing power lines in the theatre as communication lines. It is presumed that power line connections are available, or may be easily made available, at any desired location within the theatre. Indeed, at most remote cue stations, an electric-powered instrument, such as a light, is being operated, so power must be available. Further, it is assumed that the power line at each location in the system is electrically continuous with the central station, so that it can be utilized for communication purposes. If, in any existing theatre power network, remote locations are discontinuous, as due to isolation caused by an intervening transformer, the line may be made continuous at the communications frequency, and without disruption of the power network, by well known techniques.

Figure 1:
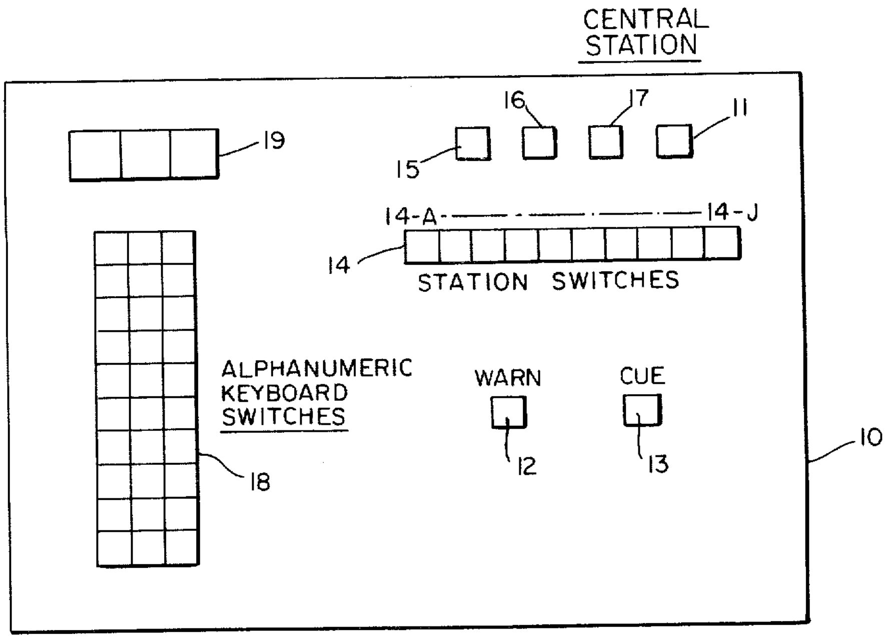
FIG. 1 is a block diagram indicating the panel of a central station of this invention, showing the switches operable and the output indicators for indicating the system operation.

Referring now to FIG. 1, there are seen illustrated the components on the central station panel. An AC power switch 11 is provided, for connecting the central station 10 to the 60 Hz 110–120 volt power lines. A warn switch 12 is provided which, when pressed by the operator, causes the transmission of a warn signal to one or more remote stations. A cue switch 13 is provided which, when pressed by the operator, transmits a cue signal to one or more remote stations. A plurality of station switches 14 is provided, each switch corresponding to a given remote station. As is described in more detail hereinbelow, engaging, or activating a given one of the station switches 14 permits communication from the central control station to the remote station corresponding to such switch.

Switch 15 (engaged/disengaged) is a manual-auto alphanumeric information advance switch. By operation of this switch, the system can be placed into an automatic mode to advance to successive alphanumeric signals automatically after each cue signal is given. For example, if the alphanumeric information is specifically cue numbers, then in the automatic mode the system advances to successive cue numbers automatically after each cue signal is given. The switch 16 is designated an "all warn" switch, which when pressed enables transmission of warn signals to all remote stations irrespective of the status of the station switches. Switch 17, designated the "master clear" switch, returns all engaged station switches to a disengaged state.

The alphanumeric keyboard 18 comprises a plurality of buttons carrying alphanumeric designations. Each column of the keyboard contains a plurality of switches (in the illustration there are 10 shown), and there are 3 such columns, providing for 3 character words where each word may be one of ten possible characters. Also shown is an alphanumeric readout indicator 19, which is a conventional alphanumeric indicator, for example one using light emitting diodes. Upon engaging any combination of the switch buttons in keyboard 18, one for each of the three columns as illustrated, the corresponding alphanumeric signal, or word, is displayed on alphanumeric readout display 19.

The alphanumeric information which is manually placed into keyboard 18 is transformed into electrical signals and made available for modulation of carriers, and is immediately transmitted to all or selected remote stations. Thus the system is designed functionally to provide the capability of generating, at the central station, warn, cue and alphanumeric signals (the warn and cue signals may also carry alphanumeric information), capability for selectively choosing which of the remote stations are to receive such signals, and to provide for successively transmitting a series of such warn-cue signal combinations from time to time throughout a performance.

Figure 2:
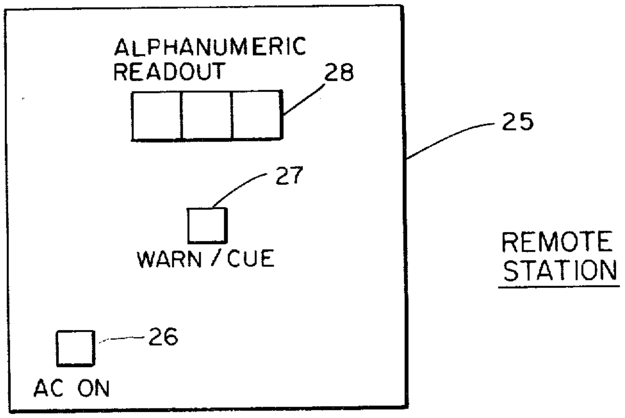
FIG. 2 is a block diagram representation of the panel of a remote station.

Referring now to FIG. 2, there is illustrated the panel of a remote station 25. There is provided an AC ON switch 26, which is directly connected to the theatre power lines through a conventional plug, for providing power to the unit 25, and through which also received and transmitted the signals from and to the central station, respectively. A warn/cue indicator 27 is a light in this preferred embodiment. It is illuminated when the warn signal is transmitted, and it is extinguished when the cue signal is received at the station. Alphanumeric readout indicator 28 provides an alphanumeric readout similar to that of alphanumeric readout 19 at the central station, whereby the operator at the remote location can be directly informed of the action to be taken at the time of cue, or at other times during the performance.

The system of this invention is at any given time in one of a plurality of states, and normally sequences progressively through three basic operational states.

The system is considered to be in the Off State whenever it has no power, as when the AC ON switch 26 of each remote station and AC ON switch 11 of the central station are disengaged. Each remote AC ON switch 26, and the central AC ON switch 11, connect the circuitry of its respective station to the AC power line. Each such switch operates independently of each other.

The system On State is entered by engaging the AC ON switch of each remote station and the central station, so as to connect power to the electrical circuitry of each such station. The On condition is indicated by the illumination of each respective switch face. While in the On State, the system may be placed in any of the following operational states:

a. The set-up state;

b. The warn state;

c. The cue state.

The system is designed to enter these states only in the order listed, thereby reducing the possibility of an incorrect signal being sent to, or displayed by, a remote station.

The set-up state is the state of the system when it is On, but has not been put into either the warn state or cue state. Initially, the set-up state is entered automatically when the system is energized, and subsequently it is entered, again automatically, from the cue state (after a cue signal has been transmitted). At the central station, any combination of station switches 14 and alphanumeric keyboard switches 18 may be engaged or disengaged. Engaging a station switch 14 enables a signal of a specific frequency, generated by a respective carrier generator, to be sent when (but only when) the warn state is subsequently entered. Upon engaging such a station switch, the upper half of the switch is lighted, as a reminder to the operator that the switch has been set. Engaging any combination of switches on the alphanumeric keyboard 18, immediately causes the alphanumeric readout at the central station to display the information entered. Such alphanumeric information is also displayed at all or selected remote stations. During the set-up state, neither warn switch 12, or cue switch 13 at the central station, nor any warn/cue switch 27 at a remote station, is illuminated.

The warn state is entered by pressing the button of the warn switch 12 at the central station 10. At this time, the system enters the warn state, and the following transitions occur:

a. Corresponding to each station for which a respective station switch 14 has been engaged, there is coupled to the AC line, and transmitted to the respective remote station, the output of a respective carrier generator.

b. The lower half of each engaged station switch face, and the face of the warn switch 12, is illuminated.

c. The upper half of each engaged station switch 14, which had been illuminated at the time such was engaged during the set-up state, is extinguished.

At each remote station 25, corresponding to an engaged station switch, entry into the warn state is indicated by the periodic illumination of the face of the warn/cue switch 27. The periodic illumination, or flashing, alerts the operator at such remote station to the fact that the warn state has been entered by the system. When the operator presses the warn/cue switch at such remote station, the remote station generates a respond signal which is coupled to the AC line, and thence to the central station where it causes illumination of the respective warn response light. Pressing the warn/cue switch also initiates constant illumination of that particular remote stations' warn/cue switch face. It is to be noted that, in this preferred embodiment, failure by the remote operator to press the warn/cue switch after receiving a warn signal does not prevent the system from entering the cue state. Also, it is to be understood that remote stations corresponding to station switch buttons which are disengaged at the master station, are unaffected by the transition into the warn state.

The cue state is entered only from the warn state, by pressing the button of the cue switch 13 at the central station. If the system is not already in the warn state, pressing of the cue switch 13 will have no affect on the system. However, when already in the warn state, the pressing of the cue switch button causes the following transitions:

a. The transmission of frequencies from respective generators to respective remote stations (corresponding to the station switch buttons which are engaged) is terminated.

b. The upper half of each engaged station switch face, as well as the upper half of the cue switch face, is illuminated.

c. The lower half of each engaged station switch face and the warn switch face are extinguished.

At each remote station corresponding to an engaged station switch, entry into the cue state is indicated by the extinguishment of the warn/cue switch face. When these operations are complete, the system is returned to the set-up state. The cue switch face remains illuminated for an additional period of about 5 to 10 seconds, as an indication to the operator that a cue has been sent. It is extinguished automatically at the end of such period, along with the warn response lights which had been illuminated.

Figure 4:
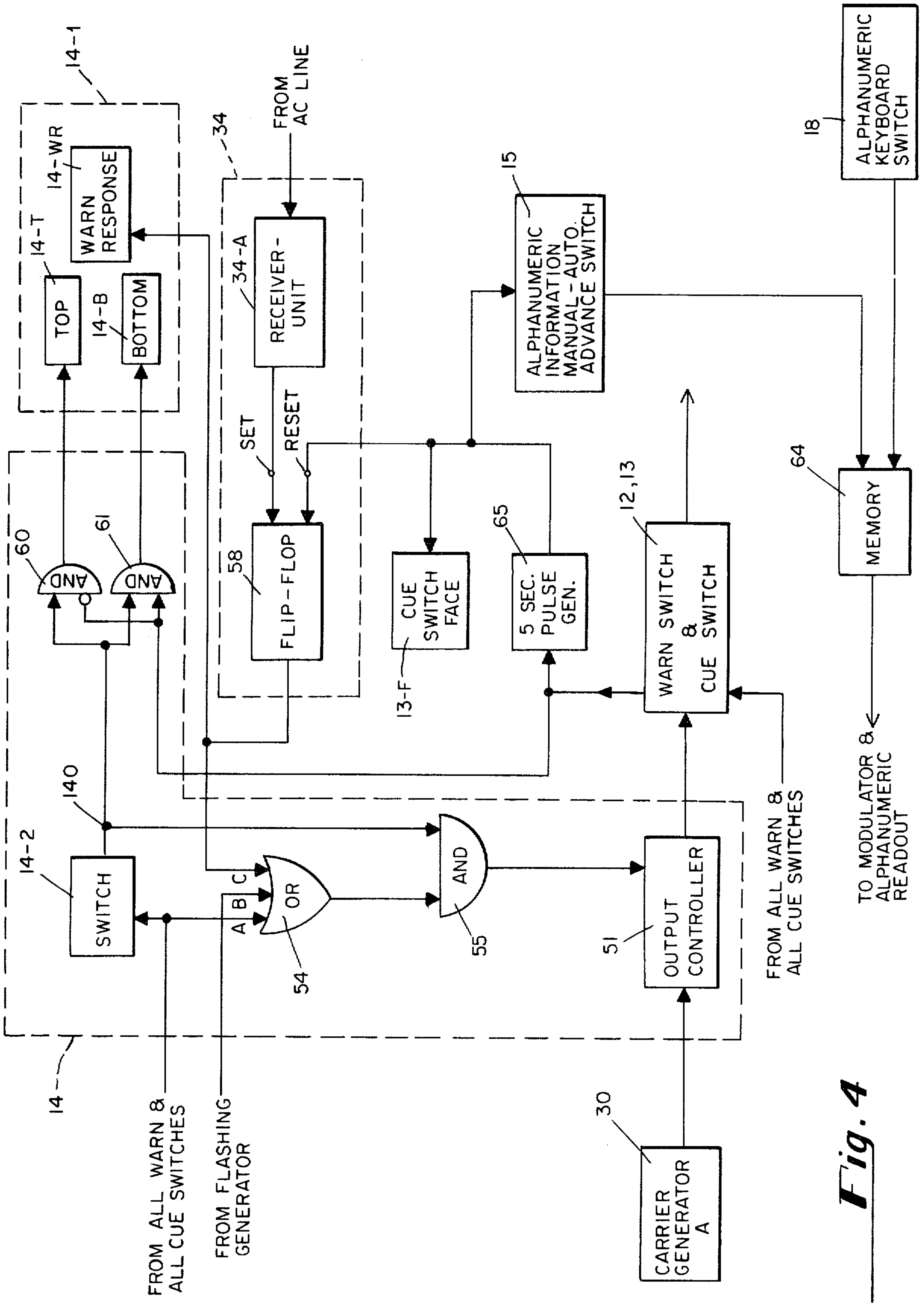
FIG. 4 is a detailed block diagram of the logic circuitry of one channel of the central control station of this invention.

The above discussion presumes that the manual-auto alphanumeric information advance switch 15 is in the manual position. In this position, each message or alphanumeric word is entered manually through the alphanumeric keyboard switches. When the manual-auto switch is placed in the auto position, system operation is modified in that concurrent with the extinguishment of the cue switch face (following transmission of the cue signal) the alphanumeric readout is automatically changed. For example, in the case where only cue numbers are being sent, the auto position causes automatic advancement of the cue number by one. If it is desired to program alphanumeric readouts having other sequences of alphanumeric information, this is done through incorporation of state of the art means, e.g., read only or disc memory. Sample circuitry for achieving this is illustrated in FIG. 4. Memory box 64 may be a conventional binary adder connected through switch 15 to cue switch 13 to cause the adder to advance one digit after transmission of each cue signal.

Figure 3:
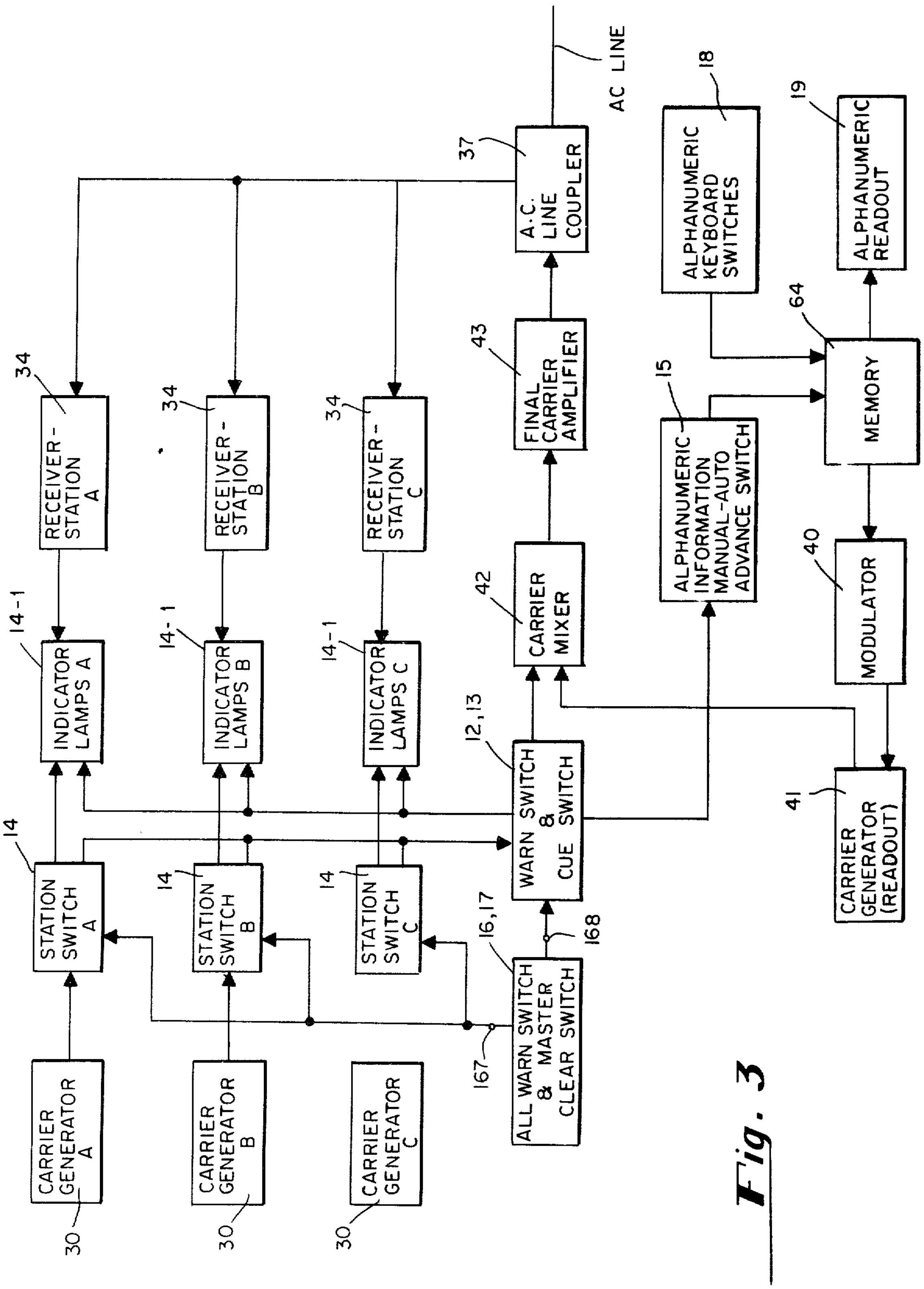
FIG. 3 is a block diagram of the circuitry of the preferred embodiment of a central control station of this invention.

Referring now to FIG. 3, there is shown a block diagram of the central station of this invention, with three station channels illustrated. It is to be understood that the block diagram representation indicates the manner in which information flows and is processed, and that the actual wired station may have its elements combined or positioned differently while still processing the signals as shown herein. Further, it is to be understood that any number of station channels may be incorporated into the system.

For each channel, corresponding to each remote station, there is a carrier generator 30, or oscillator, providing the carrier signal which is to be transmitted to the remote station. The generator 30 is switchably connected through a station switch 14 to warn switch 12 and cue switch 13. The outputs of switches 12 and 13 are tied together on a common lead, and connected to carrier mixer 42, which adds the carrier from each generator 30 which has passed through its corresponding station switch 14, together with the output of generator 41, if present. Carrier mixer 42 is a conventional adding circuit, for combining all of the aforesaid carriers. The output of mixer 42 is connected to final carrier amplifier 43, where it is boosted in power, the output of which is connected to an AC line coupler 37, for connecting the amplified carriers to the AC line of the theatre.

Still referring to FIG. 3, it is seen that the all warn switch 16 has an output connected to each of the station switches, and to warn switch 12 and cue switch 13. In operation, when switch 16 is engaged to place the system into an all warn state, a signal is coupled to the output, indicated at node 167. Such a signal, when coupled to each station switch, causes the automatic energization of such switches. Similarly, the signal output at node 168 causes energization of the warn switch 12, such that outputs from all carriers 30 are communicated through their respective station switches and through the warn switch to the carrier mixer, and thence to the AC line. When switch 17 is pressed, it acts to uncouple the signal from nodes 167 and 168, whereby the station switches 14 and the warn switch 12 are disengaged, thus uncoupling the outputs of all the carrier generators from the AC line.

As described in detail hereinbelow, each remote station has circuitry for generating a warn respond signal, which is transmitted from such remote station through the AC line and received at the AC line coupler 37. Each such warn respond signal, corresponding to respective remote stations, has its own distinct frequency, and is received by a respective receiver station 34. Upon receipt of a warn respond signal by any given station 34, a signal is generated which is coupled to one of the indicator lamps 14. Also, as seen on the block diagram, each set of indicator lamps 14, corresponding to each station, receives inputs from its respective station switch 14, and from the warn and cue switches 12, 13.

An output of the cue switch 13 is connected to a manual-auto switch 15. Each time the cue switch is pressed, a signal is generated which, when received by manual-auto switch 15, causes it to generate a binary signal which is connected to and advances memory 64, and changes the information displayed on the alphanumeric readout 19 at the central station and readouts 28 at the remotes. Thus for example, when the alphanumeric information is specifically the cue numbers and the manual-auto switch 15 is engaged (the system is in the automatic mode), then each time the cue is given the readouts advance to display the next cue number without the need of the operator entering the next cue number. In addition, the output is connected to a modulator 40, which modulates a readout carrier generator 41, the output of which is connected to the carrier mixer 42. Thus, as soon as the alphanumeric information is changed, carrier generator 41 is automatically modulated, producing a modulated signal which is passed through amplifier 43 and AC line coupler 37, and transmitted to all or selected remote stations.

Referring now to FIG. 4, there is illustrated a more detailed block diagram of the logic of the central control station, limited in illustration to one station channel. Carrier generator 30 is shown connected to an output controller circuit 51. Controller circuit 51 is a conventional gate circuit which may be controlled to pass or not pass the output of generator 30, in accordance with the signal received from AND circuit 55 connected thereto. In the absence of any signal, controller 51 prevents, or blocks the output of generator 30 from being coupled through to warn switch and cue switch 12, 13. However, when an output is present from AND circuit 55, output controller 51 passes the carrier output.

Station switch 14 is illustrated as being comprised of a switch 14-2, three AND gates 55, 60, 61, an OR gate 54, and the output controller 51. Switch 14-2 is connected, through means not shown, to a DC source, such that when the switch is engaged, such DC signal is coupled to output terminal 140. This terminal is in turn coupled to one of the input terminals of AND circuit 55. The other input terminal of AND circuit 55 is coupled to the output of an OR circuit 54, which has three input terminals. The first of such terminals is connected to the input of switch 14-2, as well as to the all warn and master clear switches. The second input terminal of OR circuit 54 is connected to a flashing generator, not shown, which may be any suitable circuit (such as a free running multivibrator) providing a continuous squarewave type signal. The third input terminal of OR circuit 54 is connected to the output of a flip-flop 58 contained within receiver station 34. It is thus seen that there is an output from AND circuit 55 only when switch 14-2 is engaged (either by being manually engaged, or by being activated by a signal from the all warn switch). When this condition is present, the output from the flashing generator is passed through OR circuit 54, such that the output of AND circuit 55 is a flashing, or on-off signal, causing the output from carrier generator 30 to be controlled, or modulated so that the carrier signal transmitted through to the AC line, and thence to the remote unit, is pulsed on and off. However, if the all warn signal is received at OR circuit 54, there is a constant output from OR circuit 54, which, combined with an output from switch 14-2, produces a constant signal from AND circuit 55, maintaining the output controller in a condition to permit continuous passage of the output of carrier generator 30. Alternately, if flip-flop 58 is set, a constant signal is received at input terminal 54-C, and in this case also the output from the controller 51 is a constant carrier signal.

Indicator lamp 14-1 is illustrated as being comprised of three separate lamps, a top lamp 14-T, a bottom lamp 14-B, and a warn response lamp 14-WR. The top and bottom lamps are driven by logic comprised of a pair of AND circuits 60 and 61 respectively. AND circuit 60 has two input terminals, a first being connected to the output terminal 140 of switch 14-2. The second, which responds to the absence of an input (as indicated by the small circle at the input) is connected through to the output of the warn switch 12. AND circuit 61 also has two input terminals, a first being tied to station switch output terminal 140, and a second being connected to the output of the warn switch.

The receiver station 34 is indicated as comprising a receiver unit 34-A, as well as a flip-flop 58 having set and reset input terminals. Receiver unit 34-A is adapted to detect the presence of a response signal received from its corresponding remote unit, and generates an output signal which is communicated to the set terminal flip-flop 58. The reset terminal of flip-flop 58 is connected to the output of a 5 second pulse generator 65, the operation of which is described hereinbelow. The output of flip-flop 58 is connected to input terminal C of OR circuit 54, and to the warn response light 14-WR.

In operation, if switch 14-2 is not engaged, neither AND circuit 60 or 61 produces an output, and neither top lamp 14-T or bottom lamp 14-B is energized. However, if switch 14-2 is engaged, (in the set-up state), a signal is transmitted to the first input terminal of AND circuit 60. Since the other, or negative input terminal of AND circuit 60 is, in such state, not receiving an output from warn switch 12, AND circuit 60 produces an output signal which energizes top lamp 14-T. At the same time, the absence of the output from warn switch 12 prevents any output from AND circuit 61, and bottom lamp 14-B is not energized. When the system is placed in the warn state, either by energization of the all warn switch or by energization of the warn switch 12, signals appear at both inputs to AND circuit 61, causing energization of bottom lamp 14-B. Simultaneously, since a signal does appear at the negative terminal of AND circuit 60, no output is produced from such circuit, thus de-energizing top lamp 14-T. When, and only when the operator at the remote unit causes a warn respond signal to be transmitted, flip-flop 58 is set, producing an output which energizes warn response lamp 14-WR. Simultaneously, the constant output from flip-flop 58 is transmitted through OR circuit 54, providing a constant output from AND circuit 55 which permits constant transmission from the carrier generator, such that a constant signal is received at the remote station whose warn/cue switch button 27 had been pressed.

The pulse generator 65 connected to the output of warn switch and cue switch 12, 13 is designed to generator a 5 second (or thereabouts) pulse at the time that the warn switch output drops from a DC level back to zero (corresponding to pressing of the cue switch). The 5 second pulse causes illumination of cue switch face 13-F, which is thus energized for the 5 second period following engagement of the cue switch. The 5 second pulse is also connected to manual-auto switch 15, which is activated to produce a pulse output, which is coupled to memory 64. Memory 64 is also driven by alphanumeric keyboard switches 18, through which alphanumeric information 64 can be entered or recalled from memory 64. Thus, after each cue signal has been communicated from the central control station, and the switch 15 is in the automatic state, the output of the memory is changed automatically. The output of the memory is connected to the modulator in alphanumeric readout, so that the new alphanumeric word is displayed on the control system panel and also communicated to all or selected remote stations. It is to be noted that a more sophisticated automatic system, such as one using read-only or disc memory, could be employed to program the successive alphanumeric words.

Figure 5:
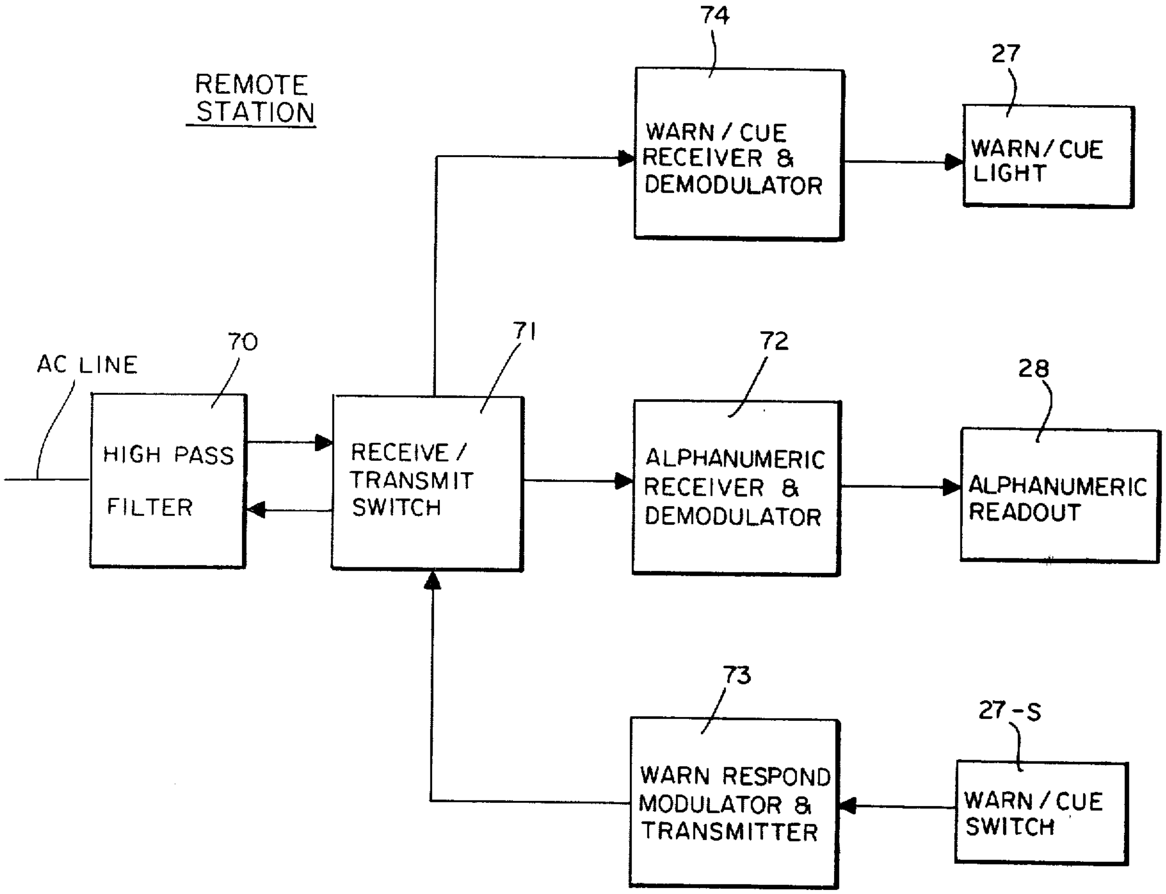
FIG. 5 is a block diagram of the circuitry of a remote station as used in the system of this invention.

Referring now to FIG. 5, there is seen a block diagram of a typical remote station. The AC line may carry signals from any of the plurality of carrier generators 30, as well as the carrier from carrier generator 41 (which carries the alphanumeric information). A high pass filter 70 is connected to the AC line, and designed to pass all the carrier frequencies assigned to the remote stations, and to block the AC line frequency. At the same time, filter 70 also passes the frequency of carrier generator 41. The output of filter 70 is connected to a conventional receive/transmit switch 71. The output of switch 71 is connected to alphanumeric receiver and demodulator 72, which passes the frequency of carrier generator 41, and demodulates, or derives from such carrier the alphanumeric information, which it then connects to alphanumeric readout 28. The output of switch 71 is also connected to warn/-cue receiver and demodulator 74, designed to pass its station-assigned frequency from its corresponding carrier generator 30. Unit 74 will develop either a flashing signal, as when the system is in the warn state (and no warn respond signal has yet been sent), or a steady signal, depending upon whether the received signal is flashing or constant. The output of unit 74 is communicated to warn/cue light 27. Warn/cue switch 27-S is connected to a signal, and when engaged communicates such signal to warn respond modulator and transmitter 73. Unit 73 may be similar to the carrier generator 30 at the central station or any other conventional device providing an output signal at a specific frequency, distinct from all other remote stations, which signal is coupled through to receive/transmit switch 71. Switch 71 couples the output of unit 73 to the AC line only during times when a warn signal is not being received.

The above embodiment of a remote station is the preferred embodiment, and a suitable embodiment for any application where the operator at the remote position is staying in a fixed position. However, in some applications it may be necessary for such remote operator (at the remote cue station) to move about. Indeed, it may be necessary to move out of a line of sight with the remote cue box. This might occur, for example, in the case of set movers. Such set movers might still, nonetheless, be required to initiate an action at an exact time, and thus require constant communication with a remote station.

To meet the above need, a portable remote cue station may be utilized, having only minor modifications with respect to the station shown in FIG. 5. Such a portable station may suitably contain a powerful amplifier and an antenna. The system is modified by transmitting and receiving from an antenna at the central station, and by providing the moving operator with a headset, or other portable device having an antenna for both receiving and transmitting. This modification, using state of the art radio techniques, is within the spirit and scope of this invention.

It is noted that the above description of a preferred embodiment is quite particular in its detail. Variations of this system are intended to be within the scope of this invention, for example, where the panel displays are modified according to user preference, and where a greater or lesser amount of cue information is transmitted.

We claim:

1. A system for simultaneous communication between a central control station in a theatre and a plurality of remote stations, such theatre having installed therein a medium which links said central control station and said plurality of remote stations, comprising:

a. carrier generator means in said central control station, having a plurality of carrier generators each producing an output signal of a different respective frequency, and each corresponding to one of said plurality of remote stations;

b. switch means in said central control station, adapted to be placed in different states, for passing said output signals when in a first state and blocking said output signals when in a second state;

c. selective coupling means in said central control station, having a plurality of station switches each corresponding to a respective one of said carrier generators, for simultaneously switchably coupling selected output signals of said carrier generators to said switch means;

d. mixing and amplifying means in said central control station, operatively connected to the output of said switch means, for mixing and amplifying signals passed through said switch means;

e. remote station means, comprising a plurality of remote stations, said stations communicating simultaneously with said central control station in selective response to said output signals each unit having circuitry for receiving and processing respective signals originating in respective ones of said carrier generators; said carrier generator means, switch means, coupling means, and mixing and amplifying means cooperating to form a theatre central control means, said central control means producing theatre operation signals individually to communicate with corresponding individual remote stations in any desired relative time sequences;

f. transmission means, comprising said medium for coupling signals from said mixing and amplifying means to said plurality of remote stations; and g. each such remote station having means for processing the received signals, and indicator means for indicating the state of the system as represented in the information carried on the processed signals.

2. A system for transmitting warn and cue signals from a central location in a theatre simultaneously to a plurality of remote cue stations, such theatre having installed therein an electric power network which links said central control station and said plurality of remote stations, comprising:

a. carrier generator means in said central control station, having a plurality of carrier generators each producing an output signal of a different respective frequency, and each corresponding to one of said plurality of remote stations;

b. switch means in said central control station, adapted to be placed in different states, for passing said output signals when in a first state and blocking said output signals when in a second state;

c. selective coupling means in said central control station, having a plurality of station switches each corresponding to a respective one of said carrier generators, for simultaneously switchably coupling selected output signals of said carrier generators to said switch means;

d. mixing and amplifying means in said central control station, operatively connected to the output of said switch means, for mixing and amplifying signals passed through said switch means;

e. remote station means, comprising a plurality of remote station units located at said remote stations, said stations communicating simultaneously with said central control station in selective response to said output signals each such unit having circuitry for receiving and processing respective signals originating in respective ones of said carrier generators, and having respond circuitry for generating response signals; said carrier generator means, switch means, coupling means, and mixing and amplifying means cooperating to form a theatre central control means, said central control means producing theatre operation signals individually to communicate with corresponding individual remote stations in any desired relative time sequences;

f. transmission means, comprising said installed power network, for coupling signals from said mixing and amplifying means to said plurality of remote station units, and for coupling said response signals from each of said remote station units to said central control station;

g. a plurality of receiver units in said central control station, each adapted to receive a selected response signal from a corresponding one of said remote station units and to produce an output signal upon such receipt;

h. indicator means in said central control station, comprising a plurality of indicator lamp groups, each such group connected to said switch means, to said coupling means, and to said receiver means, for generating indicator signals representing the state of the system; and i. each such remote station unit having means for processing the received signals, and indicator means for indicating the state of the system as represented in the information carried on the processed signals.

3. The system as described in claim 2, comprising information means in said central control station for generating signals containing informations means being connected to said transmission means for coupling signals therefrom to said plurality of remote station units, and each of said plurality of remote station units having circuitry for receiving and processing said alphanumeric signals, and output means for projecting said alphanumeric signals for viewing.

4. The system as described in claim 2, wherein said switch means contains a warn switch connected to said generators for switchably connecting the output signals of said carrier generators, and a cue switch connected to said generators for switchably disconnecting the output signals of said carrier generators, to said mixing and amplifying means.

5. The system as described in claim 4, wherein said switch means is adapted to pass said output signals from said generators to said transmission means in a first state as flashing signals, and in a second state as continuous signals.

6. A system for transmitting warn and cue signals from a central location in a theatre to a plurality of remote cue stations, such theatre having installed therein an electric power network which links said central control station and said plurality of remote stations, comprising:

a. carrier generator means in said central control station, having a plurality of carrier generators each producing an output signal of a different respective frequency, and each corresponding to one of said plurality of remote stations;

b. switch means in said central control station, adapted to be placed in different states, for passing said output signals when in a first state and blocking said output signals when in a second state;

c. selective coupling means in said central control station, having a plurality of station switches each corresponding to a respective one of said carrier generators, for switchably coupling selected output signals of said carrier generators to said switch means;

d. mixing and amplifying means in said central control station, operatively connected to the output of said switch means, for mixing and amplifying signals passed through said switch means;

e. remote station means, comprising a plurality of remote station units located at said remote stations, each such unit having circuitry for receiving and processing respective signals originating in respective ones of said carrier generators, and having respond circuitry for generating response signals;

f. transmission means, comprising said installed power network, for coupling signals from said mixing and amplifying means to said plurality of remote station units, and for coupling said response signals from each of said remote station units to said central control station;

g. a plurality of receiver units in said central control station, each adapted to receive a selected response signal from a corresponding one of said remote station units and to produce an output signal upon such receipt;

h. indicator means in said central control station, comprising a plurality of indicator lamp groups, each such group connected to said switch means, to said coupling means, and to said receiver means for generating indicator signals representing the state of the system; and i. each such remote station unit having means for processing the received signals, and indicator means for indicating the state of the system as represented in the information carried on the processed signals;

j. information means in said central control station for generating signals containing alphanumeric information, said information means being connected to said transmission means for coupling signals therefrom to said plurality of remote station units, and each of said plurality of remote station units having circuitry for receiving and processing said alphanumeric signals, and means for indicating same; and k. automatic advance means, coupled to said switch means and to said information means for automatically determining the information content of the next alphanumeric signal to be provided from said information means after each previous alphanumeric signal has been transmitted.

* * * * *